United States Patent
Maltsev et al.

(10) Patent No.: US 8,238,313 B2
(45) Date of Patent: Aug. 7, 2012

(54) TECHNIQUES FOR WIRELESS PERSONAL AREA NETWORK COMMUNICATIONS WITH EFFICIENT SPATIAL REUSE

(75) Inventors: Alexander Maltsev, Nizhny Novgorod (RU); Roman Maslennikov, Nizhny Novgorod (RU); Alexander Maltsev, Jr., Nizhny Novgorod (RU); Alexey Khoryaev, Dzerzhinsk (RU); Mikhail Shilov, Nizhny Novgorod (RU)

(73) Assignee: Intel Corporation, Santa Clara, CA (US)

(*) Notice: Subject to any disclaimer, the term of this patent is extended or adjusted under 35 U.S.C. 154(b) by 1076 days.

(21) Appl. No.: 11/855,862

(22) Filed: Sep. 14, 2007

(65) Prior Publication Data

US 2009/0073954 A1   Mar. 19, 2009

(51) Int. Cl.
 H04J 3/00 (2006.01)
 H04B 7/212 (2006.01)
 H04W 72/04 (2009.01)
(52) U.S. Cl. ......... 370/337; 370/347; 370/442; 455/451
(58) Field of Classification Search .......... 370/203–210, 370/310–349, 276–297, 431, 437, 442, 443, 370/462; 455/423, 424, 425, 63.1, 63.4, 455/70, 522, 562.1, 11.1, 13.4, 343.1, 343.6, 455/450–455, 464, 509, 515–516, 518, 561, 455/562.2, 574; 342/360, 365, 367, 368, 342/371; 714/746–750
See application file for complete search history.

(56) References Cited

U.S. PATENT DOCUMENTS

| | | | | |
|---|---|---|---|---|
| 2005/0027871 A1* | 2/2005 | Bradley et al. | ................ | 709/227 |
| 2005/0157695 A1* | 7/2005 | Stephens et al. | ............. | 370/346 |
| 2008/0175198 A1* | 7/2008 | Singh et al. | .................. | 370/329 |
| 2008/0310363 A1* | 12/2008 | McBeath et al. | ............. | 370/330 |

OTHER PUBLICATIONS

Christian Hoymann, Jan Ellenbeck, Ralf Pabst, Marc Schinnenburg, "Evaluation of Grouping Strategies for an Hierarchical SDMA/TDMA Scheduling Process", Aug. 2007.*

* cited by examiner

Primary Examiner — Habte Mered
(74) Attorney, Agent, or Firm — Thorpe, North & Western LLP

(57) ABSTRACT

An embodiment of the present invention provides a method for communicating in a wireless personal area network (WPAN), comprising using Spatial Division Multiple Access (SDMA) in said WPAN network by exploiting directional antennas.

21 Claims, 4 Drawing Sheets

TECHNIQUES FOR WIRELESS PERSONAL AREA NETWORK COMMUNICATIONS WITH EFFICIENT SPATIAL REUSE

BACKGROUND

The millimeter-wave (mmWave) WPAN communication systems operating in the 60 GHz frequency band are expected to provide several Gbps throughput to distances of about 10 m and will be entering into the service in a few years. Currently several standardization bodies (IEEE 802.15.3c, WirelessHD SIG, ECMA TG20) consider different concepts of the mmWave WPAN systems to define the systems which are the best suited for the multi-Gbps WPAN applications.

Inherent in any wireless communication systems is the need for improved throughput and reliability. Thus, a strong need exists for techniques to improve mmWave wireless personal area networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
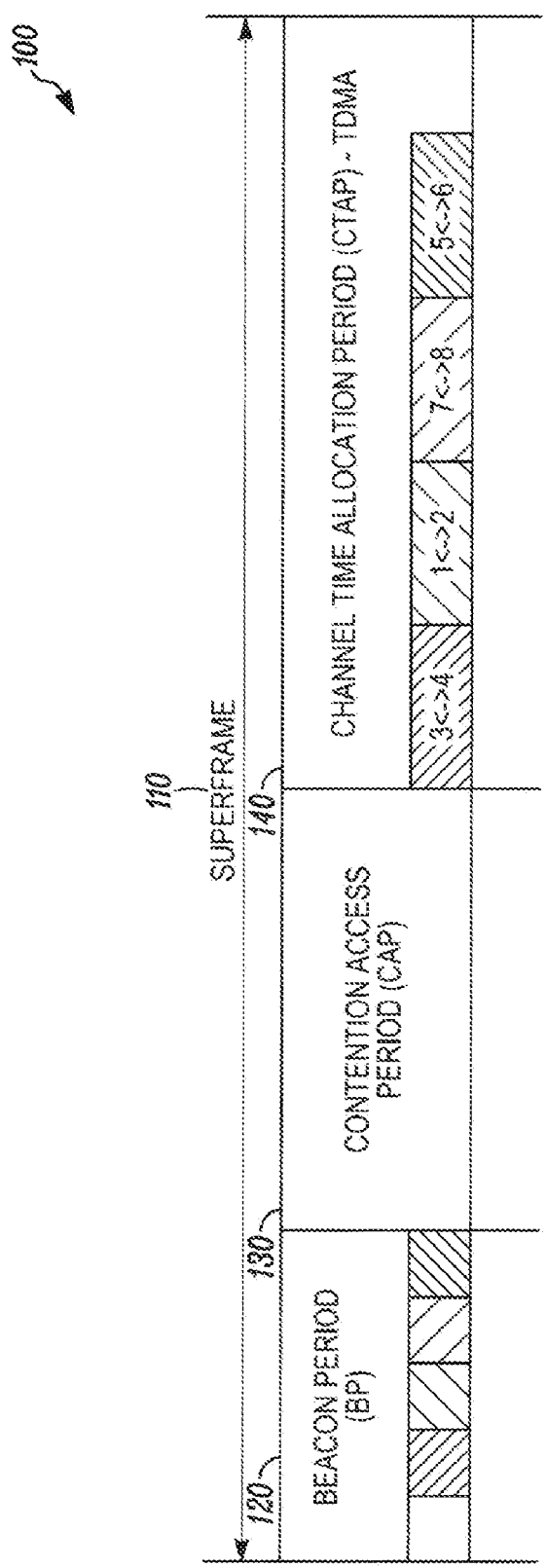
FIG. 1 illustrates A Superframe structure of the current IEEE 802.15.3-2003 standard of an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, or even high definition television signals in a PAN.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Wireless Personal Area Networks (WPAN) communication systems are extensively used for data exchange between devices over the short distances of no more than 10 meters. Current WPAN systems may exploit the frequency band in the 2-7 GHz frequency band region and achieve throughputs of up to several hundred Mbps (for Ultra-WideBand systems).

The availability of the 7 GHz of unlicensed spectrum in the 60 GHz band and the progress in the RF IC semiconductor technologies are pushing the development of the millimeter-Wave (mmWave) WPAN systems which will operate in the 60 GHz band and will achieve the throughputs of about several Gbps. Currently a number of standardization groups (IEEE 802.15.3c, Wireless HD SIG, ECMA TG20) are working on the development of the specifications for such mmWave WPAN networks. The standards are developed mainly as addendums to the previous WPAN standards with the introduction of the new PHY layers and also trying to reuse most of the MAC functionality. However, the modifications to the MAC layer are also required to exploit specific mmWave WPAN characteristics.

One of these characteristics is that the future mmWave WPAN will widely use directional antennas. The high gain of the directional antennas will be required to achieve necessary SNR margins over very wide bandwidth (~2 GHz) mmWave WPAN links under the limited (~10 dBm) transmitted power. Also the implementation of the small size high gain antennas is feasible for 60 GHz WPAN devices because of the small wavelength (5 mm). The propagation characteristics of the 60 GHz channel are close to the quasi-optical characteristics and thus the directional transmission between TX-RX pair has a low probability to interfere with the other directional TX-RX pair transmission. This property of the 60 GHz directional transmission has an effect on the design of the medium access control (MAC) layer of the mmWave WPAN systems. As there is a low probability of interference between different directional transmissions, mmWave WPAN systems have a large potential for efficient spatial reuse (having multiple parallel transmissions).

Some embodiments of the present invention provide a mmWave WPAN system based on the IEEE 802.15.3 and IEEE 802.15.3b specifications but with the introduction of the new effective mechanism of the parallel data transmission (spatial reuse or Spatial Division Multiple Access—SDMA) which is not available in the current WPAN standards (IEEE 802.15.3, WirelessHD and others).

According to the IEEE 802.15.3 standard (and current IEEE 802.15.3c proposals), the basic WPAN network is called piconet and is composed of the piconet controller (PNC) and one or more communication devices (DEVs). The channel time is divided into superframes 110, with each superframe 110 consisting of the three major parts—beacon period 120, Contention Access Period (CAP) 130 and Channel Time Allocation Period (CTAP) 140 as it is shown generally as 100 of FIG. 1. The beacon period is used by the PNC to transmit the management information to the devices. There may be beacon frames common to all devices and also beacon frames dedicated to the specific device (which may be transmitted in the directional mode). All these frames are transmitted into the beacon period. The CAP period 130 is used for random contention-based access and may be used for MAC commands, acknowledgement and data frames transmission. The CTAP 140 is usually the largest part of the superframe 110 and it is divided by the PNC into times slots allocated for data transmission between different nodes (DEVs) in the Time Division Multiple Access (TDMA) manner so that only the one transmission is happening in one time. Thus it can be seen from the described frame structure that only TDMA mechanism is used by the current IEEE 802.15.3-2003 and 802.15.3b-2005 specifications.

In the general case, to solve the spatial reuse problem optimally, the beamforming between different communicating stations has to be done not independently but jointly with explicitly taking into account the mutual interference between antenna systems and also traffic and Quality-of-Service (QoS) requirements of different stations. In such formulation this problem is not likely to be solved even theoretically and especially practically. Some simplification assumptions are required to make a practical algorithm, which can be used in the mmWave WPAN system.

Figure 2:
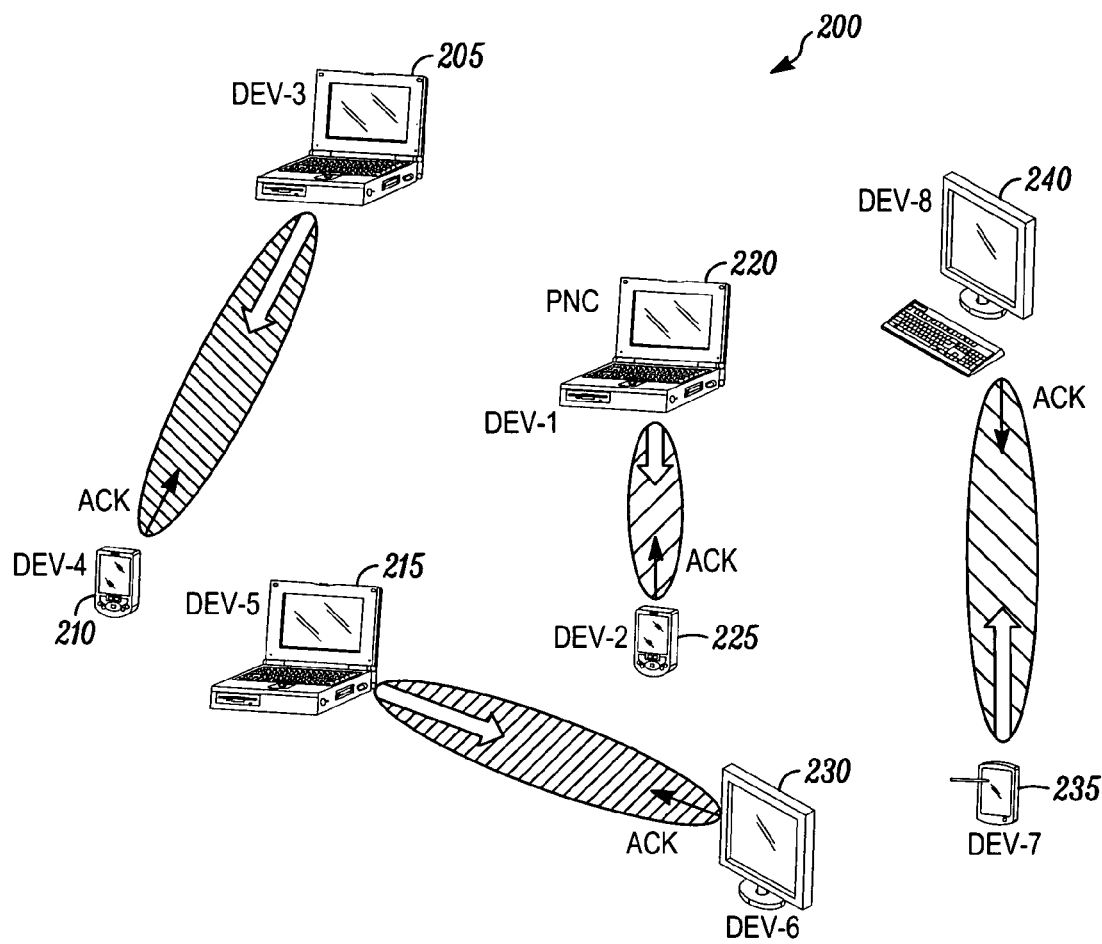
FIG. 2 shows a mmWave WPAN piconet network of an embodiment of the invention.

An embodiment of the present invention provides a new practical approach to the spatial reuse in the mmWave WPAN network exploiting directional antennas is proposed. As shown generally as 200 of FIG. 2, let us assume that in the mmWave WPAN piconet network there are several communication links which operate simultaneously between devices 205-240. In the case of the directional transmission for 60 GHz channel, the probability of the mutual interference of one link with the other is rather small. Therefore, after the beamforming training is completed there is a high probability that we can find several pairs of the devices (links) 205-240, which could work in parallel without interfering with each other; so the groups of the pairs (one or several groups) may be defined where the pairs within groups can transmit in parallel and thus can be scheduled for parallel transmission. Thus, the TDMA mode may be augmented by the SDMA mode. The channel access between different groups and communicating DEVs pairs which can not be parallelized is done in the TDMA mode while the communicating pairs within one group perform channel access in the SDMA mode.

The algorithm of the proposed mmWave WPAN network (with TDMA and SDMA modes) functioning may be realized as follows. The operation of the piconet should be started in the TDMA mode, after that the beamforming training may be performed and after the beamforming training is completed, the information about the mutual interference between pairs of devices (links) may be collected by the PNC. SDMA groups may be defined as mutually non-interfering pairs within one group and may be scheduled by the PNC for the parallel transmission. In order to perform the interference level measurements, the PNC tells the DEVs in the beacon messages not only their time slots to communicate but also the time slots to perform the measurements of the interference level and to feedback the results.

Figure 3:
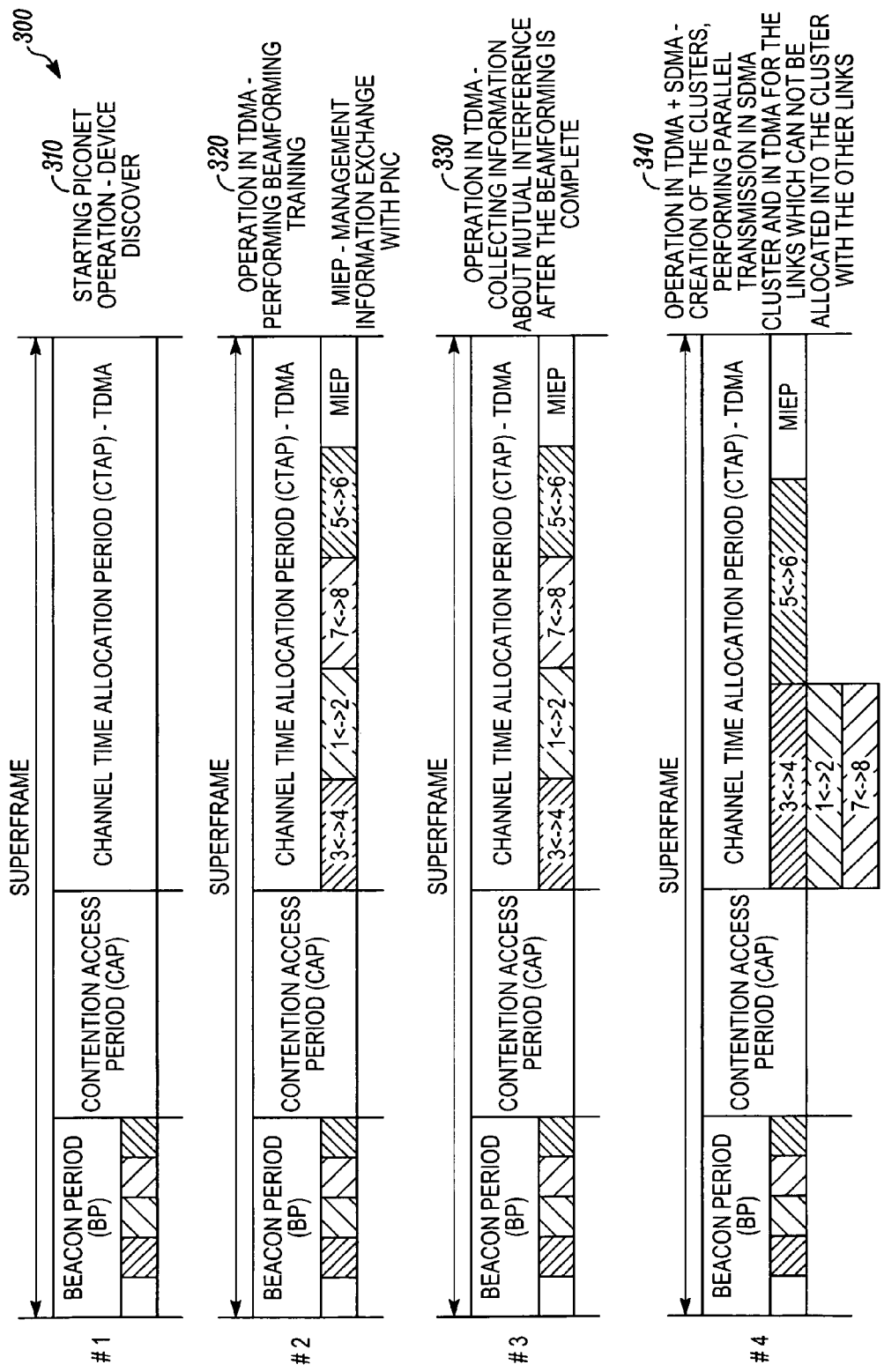
FIG. 3 depicts a timing diagram of the mmWave WPAN network operation in an embodiment of the present invention.

The example of mmWave WPAN system 200 with its functioning timing diagram are schematically shown in FIG. 3 at 300. It can be seen from the FIG. 3 that links 1-2, 3-4 and 7-8 may be bonded in one group but the link 5-6 should be allocated separately in the TDMA mode due to strong mutual interference with other links from the group. 310 shows starting the piconet operation—device discover. 320 illustrates operation in TDMA—performing beam forming training. 330 of FIG. 3 illustrates TDMA operation—collecting information about mutual interference after the beamforming is complete. 340 shows operation in TDMA and SDMA—creation of SDMA groups, performing parallel transmissions in the SDMA group and into TDMA for the links which cannot allocated into the SDMA group with other links.

Figure 4:
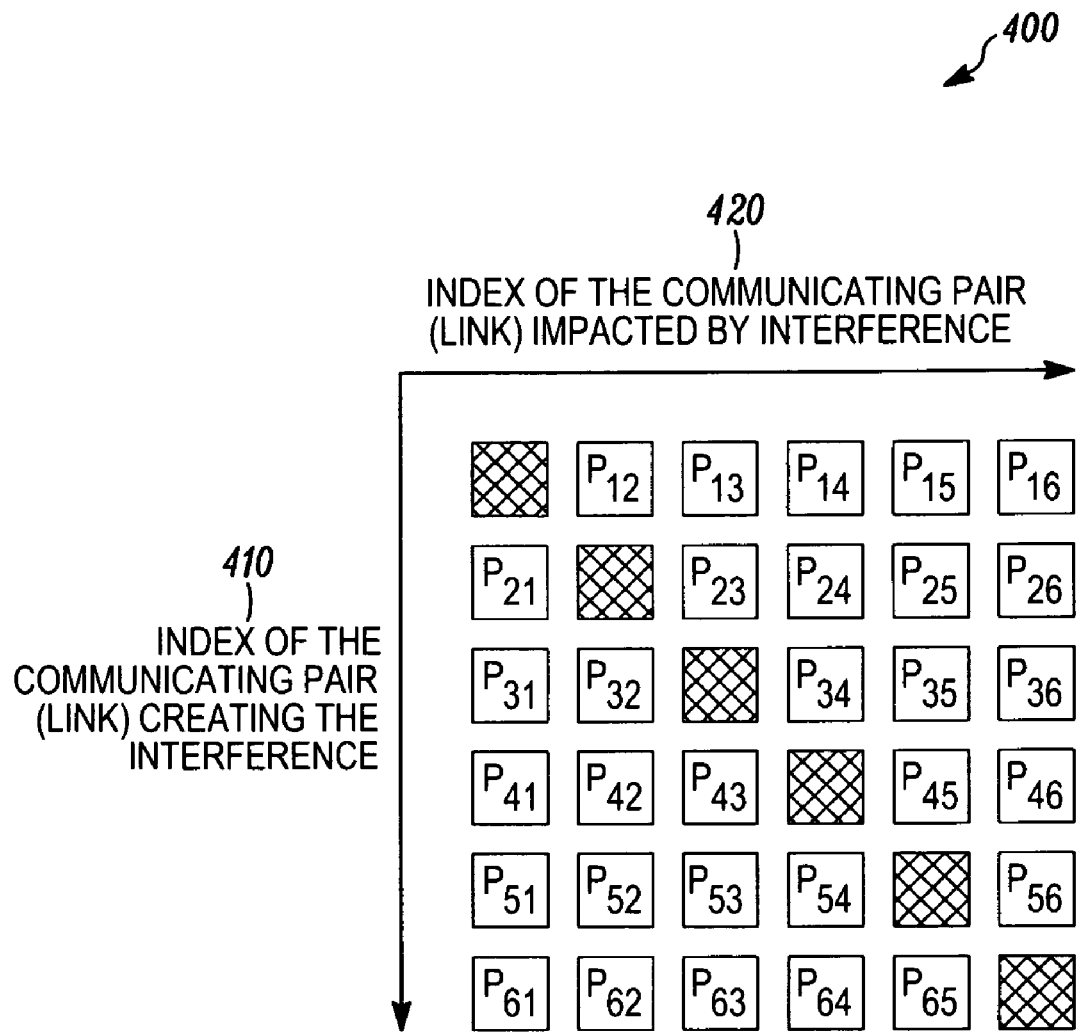
FIG. 4 illustrates an example of the mutual interference matrix structure according to one embodiment of the present invention.

The information about mutual interference can be collected and processed by the PNC in the different ways. One of the possible ways is using the mutual interference matrix, which is schematically 400 in FIG. 4 and includes an index of the communicating pair creating the interference 410 and index of communicating pairs impacted by the interference 420. All the pairs of the communicating devices (active links) are renumbered so that each pair has an index k=1, . . . , N where N is the total number of the communicating pairs. The element of the matrix $P_{ij}$ is the power of the interference at the j-th (impacted) pair created by the i-th pair. The PNC may fill up the matrix while the network system is operating in the TDMA mode and after that to define the optimal configuration of the possible groups using this mutual interference matrix, strengths of the useful signals, throughput, QoS and other requirements. The PNC may stop filling up the matrix with not measuring all the elements if it is able to define SDMA groups providing the necessary network performance improvement (e.g. throughput increase, etc.). For not measured elements of the mutual interference matrix the high interference level of the interference can be considered without loss of the generality and the corresponding links should be scheduled in the TDMA mode.

It should also be noted that the current IEEE 802.15.3 standard defines the time allocations for the transmission from m-th to the n-th nodes with taking into account that the same time slot is used for both transmitting data frames from m-th to n-th nodes and for sending back acknowledgements (ACKs) from n-th to m-th nodes. So the interference created by one communicating pair (link) to the other communicating pair is different depending on whether the transmission is done in either one or both directions. In addition, the impacted (by the interference) pair can also communicate in one or both directions and with respect to this, the interference level should be measured on either one or both stations (nodes) of the link. Different acknowledgement strategies (no-ACK, delayed-ACK, immediate-ACK and others) can be applied by the stations and depending on this, the communications within one time slot can de done in either one or both directions. This fact has to be taken into account upon the definition of the SDMA groups of the piconet.

To address this issue an embodiment of the present invention provides using two types of SDMA groups in the mmWave network—unidirectional and bidirectional SDMA groups. Transmission in only one direction is allowed in the unidirectional SDMA groups while the bidirectional transmission can be done in the bidirectional SDMA groups. The bidirectional groups use the same time slots for data frame transmission and their ACKs while in the unidirectional groups only the data frames (or ACKs) are transmitted while the corresponding ACKs (or date frames respectively) are transmitted in the other SDMA groups or TDMA-allocated time slots. So no-ACK and delayed-ACK acknowledgement policies have to be used by the stations allocated to the unidirectional groups. In the case of the no-ACK policy, no ACKs are required to send back. In the case of the delayed-ACK policy, the unacknowledged frames are sent in the unidirectional SDMA groups and after that the transmitting station should request ACK for all the previously transmitted frames in the TDMA or bidirectional SDMA modes. The practical mmWave WPAN system can use either single or both types of SDMA groups (unidirectional and bidirectional) depending on the network performance improvement providing by such mechanisms.

The advantage of using the unidirectional SDMA groups is that there is a lower probability of the interference between communicating pairs (i.e. more efficient spatial reuse may be done) but the disadvantage is that not all the ACK policies may be used. Oppositely, the bidirectional SDMA groups have the advantage of arbitrary use of the ACK policies, but the disadvantage of having the lower probability of successful big SDMA groups creation.

In addition, special considerations have to be done for the training (interference level measurement) of the bidirectional links. The PNC has to make sure that transmissions in both directions are done during the time interval allocated by the PNC to the stations of impacted link for interference level measurement of the stations from the interference-creating link. This requirement may be met by forcing the receiving station to send back acknowledgement or some dedicated training frame if the acknowledgements are not required.

The number of the unidirectional links (communicating pairs) is two times higher than the number of the bidirectional links (unless some links are not used). Therefore, the mutual interference matrices are different for these cases with the unidirectional matrix having four times more elements than the bidirectional matrix. The bidirectional matrix can be defined from the unidirectional matrix using some algorithm to convert four matrix elements (interference levels) into the one. One of the algorithms may be a selection of the maximum element out of the four elements of unidirectional matrix as a single element for the bidirectional matrix.

Note that, the orthogonality of the links in one SDMA group (i.e. absence or small level of the interference within the group) may become broken during the system operation. This may be due to several factors with the main factor to be the change of the propagation channel characteristics and the following readjustment of the antenna patterns (beamforming). If the stations operating within given SDMA group start experiencing the increase of the interference level (receive station can not decode correctly and the transmit station does not receive ACKs for transmitted frames) they should report this to the PNC which has to stop the given SDMA group simultaneous operation and allocate all the pairs from the group into the TDMA mode and start procedure of the new SDMA groups creation again.

Though the loss of the orthogonality within SDMA group may occur, it will not happen often in the practical system because the mmWave WPAN propagation channel and corresponding beamforming are usually stable over time intervals much longer compared to the superframe length. (The length of the superframe is usually several milliseconds while the channel can be stable for several seconds and more).

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method for communicating in a wireless personal area network (WPAN), comprising:

using Spatial Division Multiple Access (SDMA) in said WPAN network by exploiting directional antennas;

allocating SDMA devices into two types of SDMA groups in said WPAN, unidirectional and bidirectional SDMA groups, and wherein transmission in only one direction within each communicating pair is allowed in the unidirectional SDMA groups, while bidirectional transmission within communicating pairs can be done in the bidirectional SDMA groups, said bidirectional SDMA groups use a same time slot for transmission of data frames and acknowledgement frames (ACKs); and wherein in said unidirectional SDMA groups, when a data frame is transmitted in a specific unidirectional SDMA group then the corresponding ACK to the data frame transmitted in the specific unidirectional SDMA group is transmitted in another bidirectional or unidirectional SDMA group other than the specific unidirectional group or TDMA-allocated time slots and when an ACK is transmitted in the specific unidirectional group then the corresponding data frame to the ACK transmitted in the specific unidirectional SDMA group was previously transmitted in another bidirectional or unidirectional SDMA group other than the specific unidirectional SDMA group or TDMA-allocated time slots and a delayed-ACK acknowledgement policy is used by devices allocated to said unidirectional groups.

2. The method of claim 1, further comprising using Time Divisional Multiple Access (TDMA) in combination with said SDMA in said WPAN, wherein pairs of devices which can communicate in parallel are combined in groups.

3. The method of claim 2, wherein the operation of the WPAN network is started using TDMA and beamforming training is performed and after the beamforming training is completed, the information about the mutual interference between pairs of devices is collected by a piconet controller (PNC) and SDMA groups are defined such that mutually non-interfering and weakly interfering pairs within one group may be scheduled by said PNC for the parallel transmission.

4. The method of claim 3, wherein in order to perform the interference level measurements, said PNC tells the devices in beacon messages not only their time slots to communicate, but also the time slots to perform measurements of the interference level from other devices and to feedback the measurement results to said PNC.

5. The method of claim 1, further comprising using a piconet controller (PNC) to make sure that for bidirectional SDMA groups the transmissions in both directions are done during the time interval allocated for the interference level measurements by forcing the receiving devices to send back acknowledgement or some dedicated training frame if the acknowledgements are not required.

6. The method of claim 5, further comprising using a mutual interference matrix by said PNC to collect and process information about mutual interference and wherein the elements of the mutual interference matrix correspond to the interference level experienced by one communication pair while another communications pair is active.

7. The method of claim 5, wherein if devices operating within a given SDMA group start experiencing an increased interference level or are unable to decode the received frames or do not obtain acknowledgements for the transmitted messages, a report is made to said PNC which stops the given SDMA group simultaneous operation and allocates a subset or all pairs from said given SDMA group into the TDMA mode and starts the procedure of creating new SDMA groups again.

8. An apparatus, comprising:
- a transceiver for communicating in a wireless personal area network (WPAN), wherein said transceiver uses Spatial Division Multiple Access (SDMA) in said WPAN network by exploiting directional antennas; and
- wherein said transceiver is adapted to allocate SDMA devices into two types of SDMA groups in said WPAN, unidirectional and bidirectional SDMA groups, and wherein transmission in only one direction within each communicating pair is allowed in the unidirectional SDMA groups, while bidirectional transmission within communicating pairs can be done in the bidirectional SDMA groups,
- said bidirectional SDMA groups use a same time slot for transmission of data frames and acknowledgement frames (ACKs); and
- wherein in said unidirectional SDMA groups, when a data frame is transmitted in a specific unidirectional SDMA group then the corresponding ACK to the data frame transmitted in the specific unidirectional SDMA group is transmitted in another bidirectional or unidirectional SDMA group other than the specific unidirectional group or TDMA-allocated time slots and when an ACK is transmitted in the specific unidirectional group then the corresponding data frame to the ACK transmitted in the specific unidirectional SDMA group was previously transmitted in another bidirectional or unidirectional SDMA group other than the specific unidirectional SDMA group or TDMA-allocated time slots and a delayed-ACK acknowledgement policy is used by devices allocated to said unidirectional groups.

9. The apparatus of claim 8, wherein said transceiver further uses Time Divisional Multiple Access (TDMA) in combination with said SDMA in said
- WPAN, wherein pairs of devices which can communicate in parallel are combined in groups.

10. The apparatus of claim 9, wherein the operation of the WPAN network is started using TDMA and beamforming training is performed and after the
- beamforming training is completed, the information about the mutual interference between pairs of devices is collected by a piconet controller (PNC) and SDMA groups are defined such that mutually non-interfering and weakly interfering pairs within one group may be scheduled by said PNC for the parallel transmission.

11. The apparatus of claim 10, wherein in order to perform interference level measurements, said PNC tells the devices in beacon messages not only
- their time slots to communicate, but also the time slots to perform the measurements of the
- interference level from other devices and to feedback the measurement results to said PNC.

12. The apparatus of claim 9, further comprising a piconet controller (PNC) to make sure that for bidirectional SDMA groups the transmissions in both directions are done during the time interval allocated for the interference level measurements by forcing the receiving devices to send back acknowledgement or some dedicated training frame if the acknowledgements are not required.

13. The apparatus of claim 12, wherein said PNC uses a mutual interference matrix by said PNC to collect and process information about mutual interference and wherein the elements of the mutual interference matrix correspond to the interference level experienced by one communication pair while another communications pair is active.

14. The apparatus of claim 12, wherein if devices operating within a given SDMA group start experiencing an increased interference level or are unable to decode the received frames or do not obtain acknowledgements for the transmitted messages, a report is made to said PNC which stops the given SDMA group simultaneous operation and allocates a subset or all pairs from said given SDMA group into the TDMA mode and starts the procedure of creating new SDMA groups again.

15. A non-transitory computer readable medium encoded with computer executable instructions, which when accessed, cause a machine to perform operations comprising:
- using Spatial Division Multiple Access (SDMA) in a wireless personal area network (WPAN) by exploiting directional antennas; and
- allocating SDMA devices into two types of SDMA groups in said WPAN, unidirectional and bidirectional SDMA groups, and wherein transmission in only one direction within each communicating pair is allowed in the unidirectional SDMA groups, while bidirectional transmission within communicating pairs can be done in the bidirectional SDMA groups,
- said bidirectional SDMA groups use a same time slot for transmission of data frames and acknowledgement frames (ACKs); and
- wherein in said unidirectional SDMA groups, when a data frame is transmitted in a specific unidirectional SDMA group then the corresponding ACK to the data frame transmitted in the specific unidirectional SDMA group is transmitted in another bidirectional or unidirectional SDMA group other than the specific unidirectional group or TDMA-allocated time slots and when an ACK is transmitted in the specific unidirectional group then the corresponding data frame to the ACK transmitted in the specific unidirectional SDMA group was previously transmitted in another bidirectional or unidirectional SDMA group other than the specific unidirectional SDMA group or TDMA-allocated time slots and a delayed-ACK acknowledgement policy is used by devices allocated to said unidirectional groups.

16. The non-transitory computer readable medium of claim 15, further comprising using Time Divisional Multiple Access (TDMA) in combination with said SDMA in said WPAN, wherein pairs of devices which can communicate in parallel are combined in groups.

17. The non-transitory computer readable medium of claim 16, wherein the operation of the WPAN network is started using TDMA and beamforming training is performed and after the beamforming training is completed, the information about the mutual interference between pairs of devices is collected by a piconet controller (PNC) and SDMA groups are defined such that mutually non-interfering and weakly interfering pairs within one group may be scheduled by said PNC for the parallel transmission.

18. The non-transitory computer readable medium of claim 17, wherein in order to perform interference level measurements, said PNC tells the devices in beacon messages not only their time slots to communicate, but also the time slots to perform the measurements of the interference level from other devices and to feedback the measurement results to said PNC.

19. The non-transitory computer readable medium of claim 16, further comprising using a piconet controller (PNC) to make sure that for bidirectional SDMA groups the transmissions in both directions are done during the time interval allocated for the interference level measurements by forcing the receiving devices to send back acknowledgement or some dedicated training frame if the acknowledgements are not required.

20. The non-transitory computer readable medium of claim 19, further comprising using a mutual interference matrix by said PNC to collect and process information about mutual interference and wherein the elements of the mutual interference matrix correspond to the interference level experienced by one communication pair while another communications pair is active.

21. The non-transitory computer readable medium of claim 19, wherein if devices operating within a given SDMA group start experiencing an increased interference level or are unable to decode the received frames or do not obtain acknowledgements for the transmitted messages, a report is made to said PNC which stops the given SDMA group simultaneous operation and allocates a subset or all pairs from said given SDMA group into the TDMA mode and starts the procedure of creating new SDMA groups again.

* * * * *